US 6,618,950 B2

(12) United States Patent
Huang et al.

(10) Patent No.: US 6,618,950 B2
(45) Date of Patent: Sep. 16, 2003

(54) PROJECTION APPARATUS FOR DEMARCATION

(75) Inventors: Chao-Chi Huang, Taipei (TW); Sheng-Ching Wu, Keelung (TW)

(73) Assignee: Quarton, Inc (TW)

( * ) Notice: Subject to any disclaimer, the term of this patent is extended or adjusted under 35 U.S.C. 154(b) by 0 days.

(21) Appl. No.: 10/027,128

(22) Filed: Dec. 26, 2001

(65) Prior Publication Data

US 2003/0029049 A1 Feb. 13, 2003

(30) Foreign Application Priority Data

Aug. 10, 2001 (TW) ......................................... 90213626

(51) Int. Cl.[7] .............................................. G01C 15/00
(52) U.S. Cl. ....................... 33/286; 33/DIG. 21; 33/285
(58) Field of Search .......................... 33/286, 227, 228, 33/281–283, 285, DIG. 21, 333, 334, 568, 569, 290

(56) References Cited

U.S. PATENT DOCUMENTS

| 761,219 | A | * | 5/1904 | Goodwin | 33/290 |
|---|---|---|---|---|---|
| 1,805,004 | A | * | 5/1931 | Newsome | 33/290 |
| 3,911,588 | A | * | 10/1975 | Ohneda | 33/286 |
| 5,144,487 | A | * | 9/1992 | Hersey | 359/629 |
| 5,212,889 | A | * | 5/1993 | Lysen | 33/286 |
| 5,272,814 | A | * | 12/1993 | Key | 33/290 |
| 5,485,266 | A | * | 1/1996 | Hirano et al. | 356/249 |
| 5,552,886 | A | * | 9/1996 | Kitajima et al. | 356/250 |
| 6,035,540 | A | * | 3/2000 | Wu et al. | 33/286 |
| 6,195,901 | B1 | * | 3/2001 | Falb | 33/286 |
| 2002/0092185 | A1 | * | 7/2002 | Wu | 33/281 |

* cited by examiner

Primary Examiner—Diego Gutierrez
Assistant Examiner—Amy R. Cohen
(74) Attorney, Agent, or Firm—Raymond Sun

(57) ABSTRACT

A projection apparatus has a frame having a top seat, a main body and a light source module. The main body includes a hanging mechanism that is pivotable about the top seat with respect to a first axis direction and a second axis direction, and a connection seat having an adjustment mechanism that is coupled to the hanging mechanism in a manner that allows for adjustment of the inclination angle between the connection seat and the hanging mechanism. The light-source module is coupled to the connection seat and projects a light plane.

14 Claims, 8 Drawing Sheets

PROJECTION APPARATUS FOR DEMARCATION

BACKGROUND OF THE INVENTION

1. Field of the Invention

The present invention relates to a projection apparatus for demarcation.

2. Description of the Prior Art

Recently, due to the increase of the population in cities, and the scarcity of land, building projects have focused on building upwardly, which means that many skyscrapers have been built up in cities like trees in a jungle. Because skyscrapers are built up from the ground surface, the measuring point for building up, and base line for measuring and demarcating operations, for the base and interior of buildings have become very important key-points.

When the above operations are applied to instrument measurements for demarcating distance or for plumb fixing-point, it can be difficult to create an actual straight line, and it is also difficult to control the placing directions and angles. In addition, because the plumb fixing-point is sometimes interfered with and swung by outside influences (e.g., wind), and further because the legs of the instruments are set up for the convenience of movement or adjustment, it is difficult to accurately make the plumb aim at the starting measuring-point. The quality and procedure of the operation are therefore compromised.

During building construction and decoration construction, the uneven nature of the ground can often make the arrangement and adjustment of the legs of a plumb or instrument difficult to carry out. As a result, it is often difficult to accurately carry out the measurement and demarcation for horizontal and vertical lines because the angle and direction of the measurement may be shifted, and because the measurement may not be able to bring out an actual straight line.

Thus, there remains a need for a projection apparatus that overcomes the drawbacks identified above.

SUMMARY OF THE DISCLOSURE

It is an object of the present invention to provide a projection apparatus for demarcation that can project a horizontal plane that is parallel to a ground surface or any number of points having the same horizontal height.

It is another object of the present invention to provide a projection apparatus for demarcation that can accurately project actual horizontal lines even when the apparatus is rested on an undulated or uneven topography.

It is yet another object of the present invention to provide a projection apparatus for demarcation that minimizes vibration and interference from external influences.

To achieve the above objectives, the present invention provides a projection apparatus that has:

a frame having a top seat;
a main body that includes:
  a hanging mechanism that is pivotable about the top seat with respect to a first axis direction and a second axis direction;
  a connection seat having an adjustment mechanism that is coupled to the hanging mechanism in a manner that allows for adjustment of the inclination angle between the connection seat and the hanging mechanism; and
a light-source module coupled to the connection seat for projecting a light plane.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
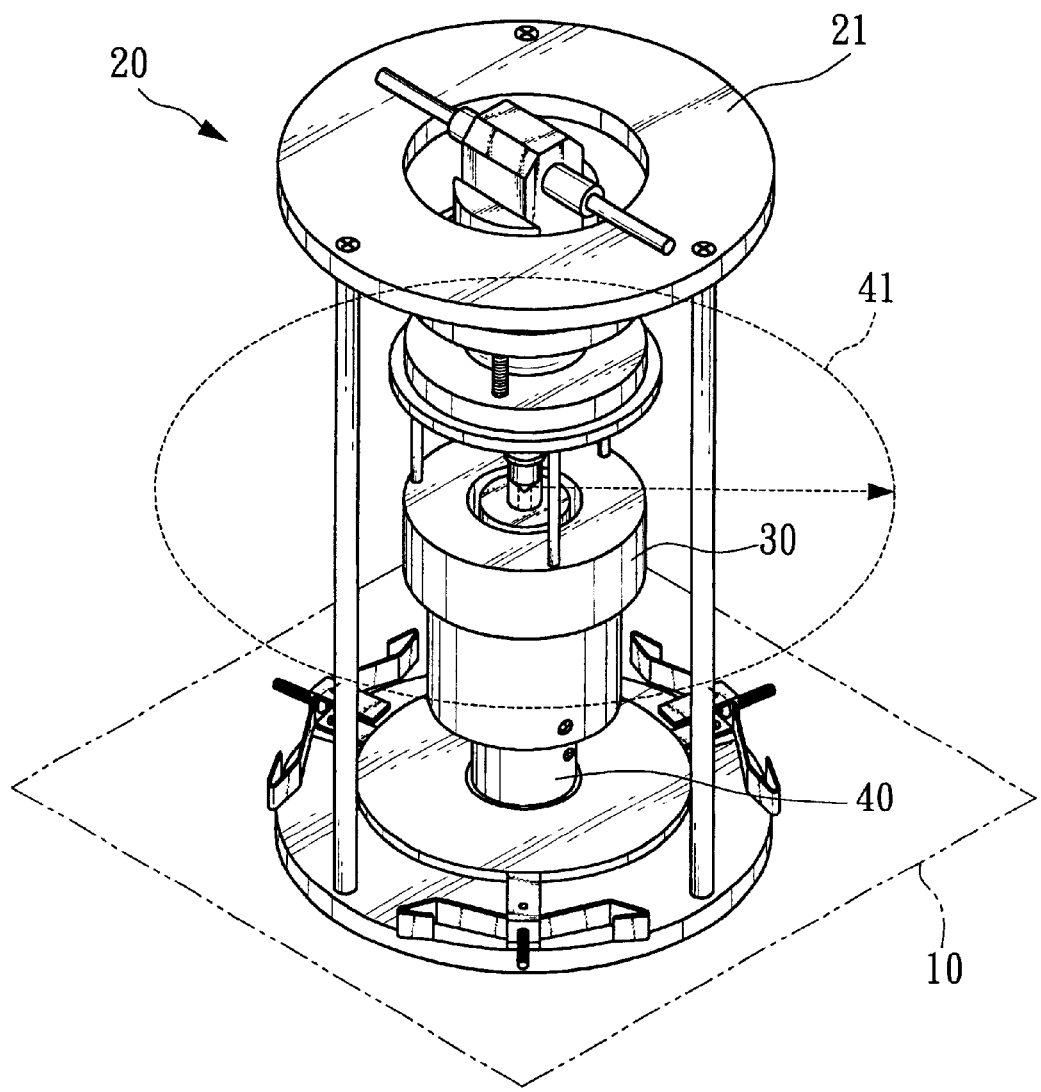
FIG. 1 is a perspective view a projection apparatus according to one embodiment of the present invention.
Figure 2:
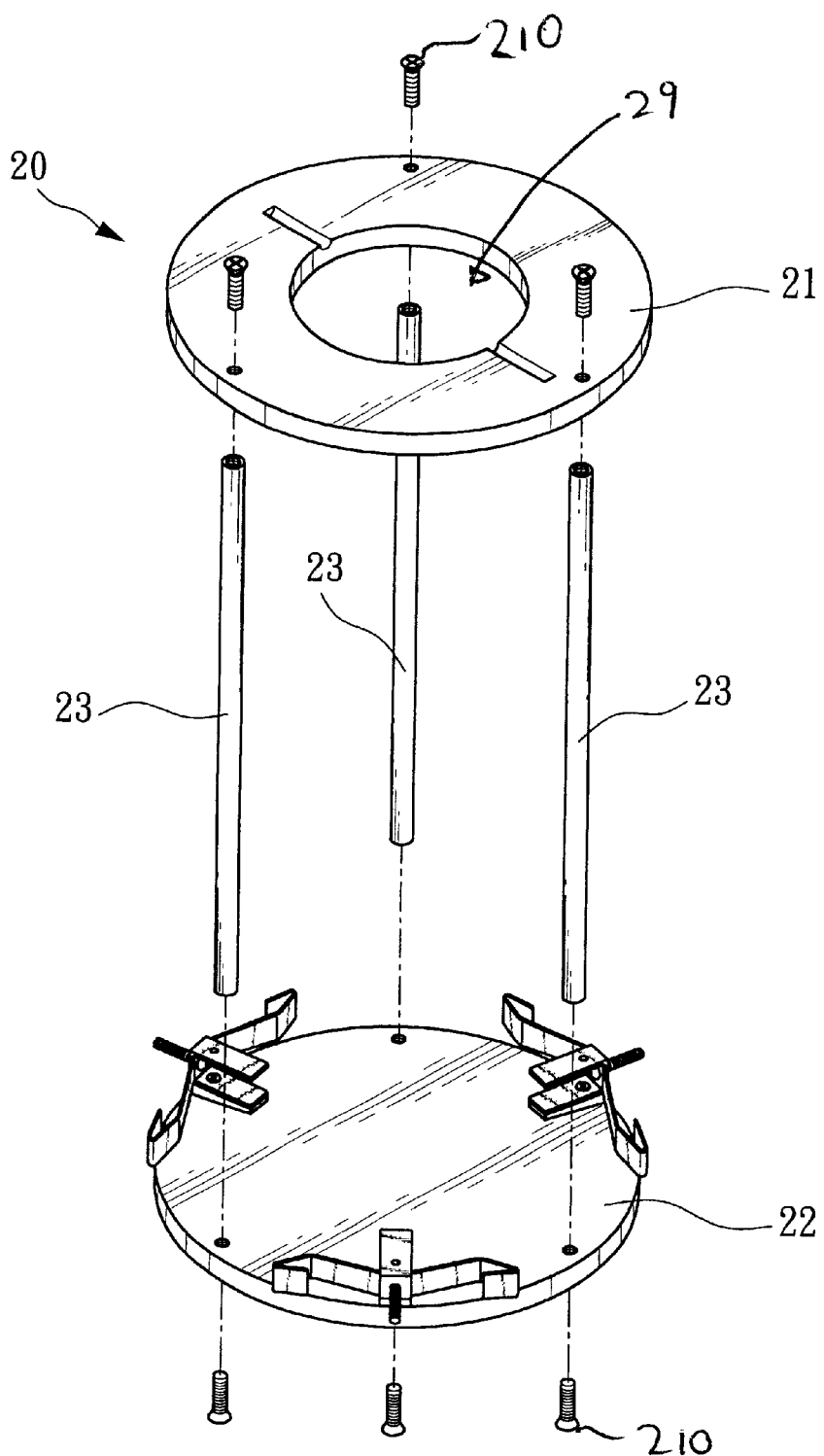
FIG. 2 is an exploded perspective view of the projection apparatus of FIG. 1.
Figure 3:
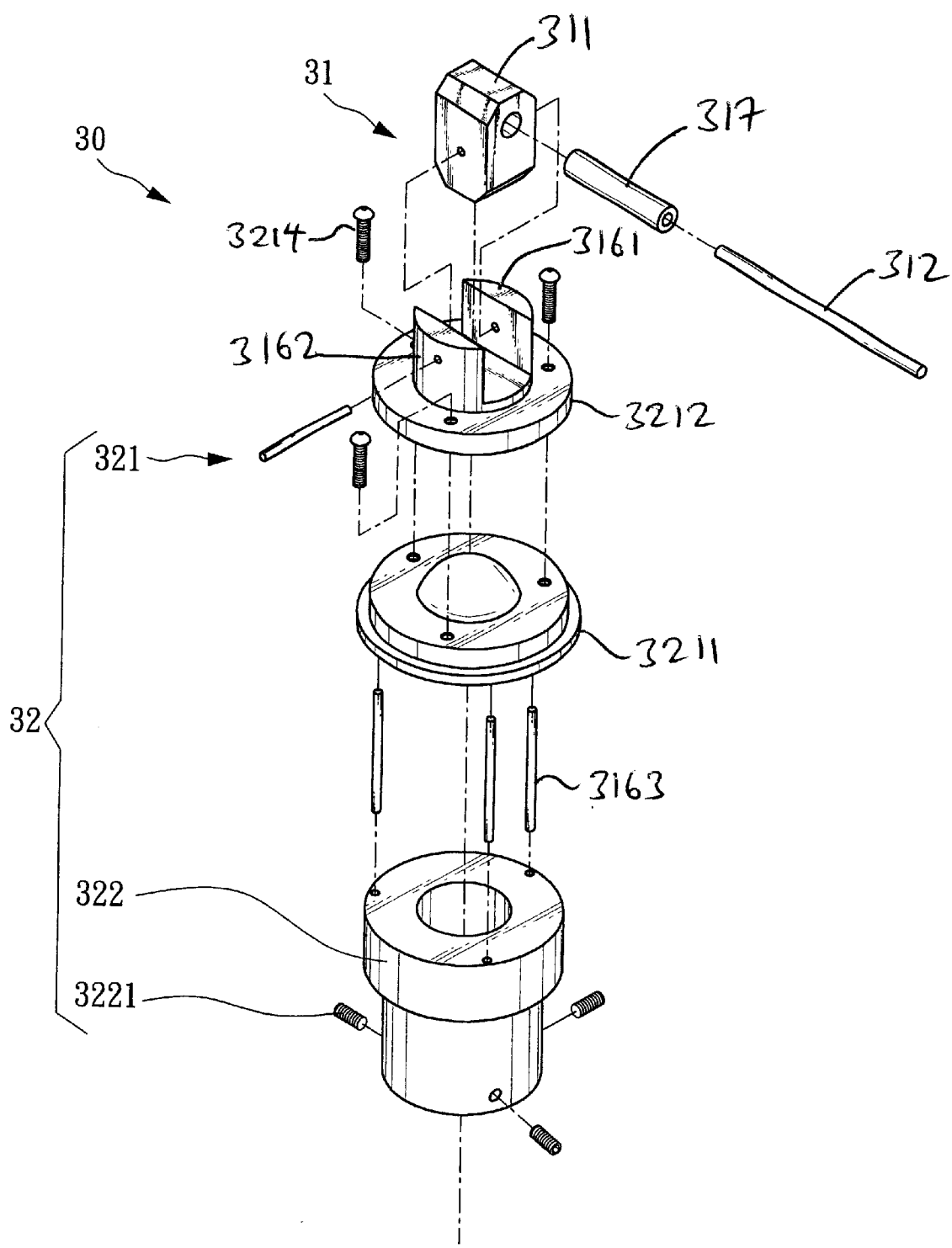
FIG. 3 is an exploded perspective view of a portion of the apparatus of FIG. 1.

FIGS. 1–3 illustrate one embodiment of a projection apparatus for demarcation of the present invention. The projection apparatus of the present invention includes a machine frame 20, a main body 30, and a light-source module 40. The machine frame 20 is arranged to be placed on a working table 10 and has a top seat 21 that is maintained at an appropriate height from the working table 10. The machine frame 20 may be supported on a three-legged frame (e.g., a tripod) or any other known fixation frames (not shown) to facilitate use of the machine frame 20 with various uneven topographies. The main body 30 is suspended from the top seat 21 of the machine frame 20 by the force of gravity. The light-source module 40 is connected to the main body 30 and projects a light plane 41, as explained below.

The top seat 21 can be a ring-shaped structure having an inner hole 29. For example, the top seat 21 is illustrated in FIG. 2 as being a circular ring with a circular inner hole 29, but the top seat 21 and its inner hole 29 may have a square or other configuration. The machine frame 20 further includes a base seat 22, which is adapted to be placed on the working table 10. The top seat 21 is supported above the base seat 22 by a plurality of supporting rods 23. Screws 210 can be used to secure the rods 23 to the top seat 21 and the base seat 22.

Referring also to FIG. 3, the main body 30, which is suspended from the inner hole 29 of the top seat 21, includes a hanging mechanism 31 and a connection seat 32. The hanging mechanism 31 is pivotably suspended from the top seat 21, and the connection seat 32 is connected to the hanging mechanism 31. The connection seat includes an adjustment mechanism 321 that can be used to adjust and change the inclination angle of the connection between the connection seat 32 and the hanging mechanism 31. The connection seat 32 also includes a seat body 322, which has a hollow luminal interior that receives the light-source module 40, and a plurality of screws 3221 can be provided for securing (e.g., bolting) the light source module 40 to the seat body 322. The top of the seat body 322 is secured via a plurality of connector legs 3163 to the bottom of a first base block 3211 (which is described below) in a manner in which the connector legs 3163 separate the seat body 322 from the first base block 3211 by a distance.

Figure 4A:
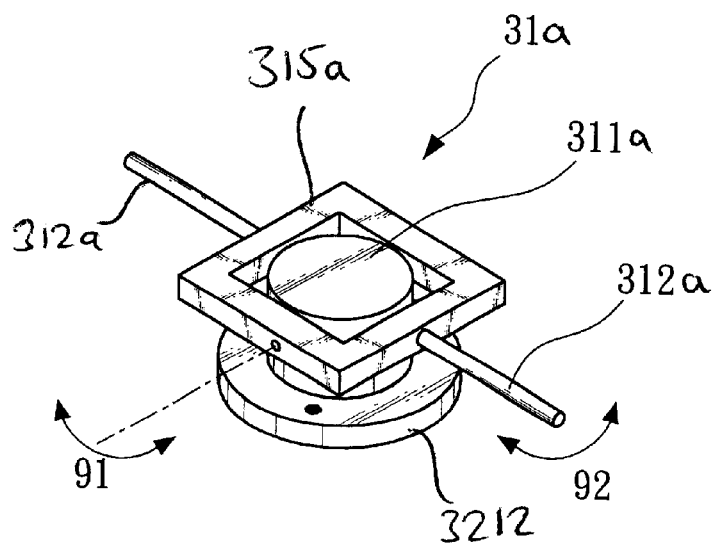
FIG. 4A is a perspective view of a hanging mechanism that can be used with the apparatus of FIG. 1.
Figure 4B:
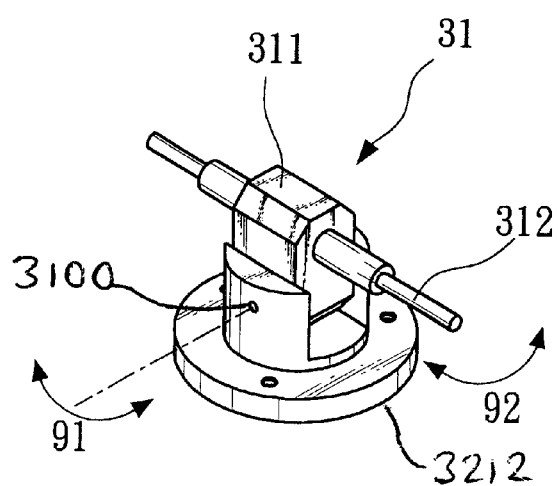
FIG. 4B is a perspective view of a hanging mechanism that is used with the apparatus of FIG. 1.

FIGS. 4A and 4B illustrate two different hanging mechanisms 31a and 31, respectively, that can be used with the apparatus of the present invention, with the embodiment of FIG. 4B being shown in use in FIGS. 1–3. Referring first to FIG. 4B, the hanging mechanism 31 has a connection block 311 having a throughbore for receiving a hanging rod 312 that defines a hanging axis. A bearing 317 (see FIG. 3) can be provided in the throughbore to make the pivoting of the rod 312 smoother. The connection block 311 is pivotably secured in the space defined by two parallel walls 3161 and 3162 that extend from a second base block 3212 (which is described below), and is pivoted about an axis defined by a shaft 3100 that extends through the walls 3161, 3162 and the block 311. The hanging rod 312 is adapted to be swung or pivoted on the top surface of the top seat 21, as shown in FIG. 1. The connection block 311 can be swung along two different axes. For example, the block 311 can be swung in a first axis direction 91 about the axis 3100, and in a second axis direction 92 about an axis defined by the rod 312. The first axis direction 91 and the second axis direction 92 can be perpendicular to each other, so that the orientation of the main body 30 can be adjusted in two different axes.

Referring now to FIG. 4A, the hanging mechanism 31a has a connection block 311a that is fitted inside an enclosing ring 315a. Two aligned hanging rods 312a are journaled through opposing sides of the enclosing ring 315. The hanging rods 312a are adapted to be swung or pivoted on the top surface of the top seat 21, as shown in FIG. 1. The connection block 311a and its enclosing ring 315a can be swung along the same two different axes described above: in a first axis direction 91, and in a second axis direction 92. The first axis direction 91 and the second axis direction 92 can be perpendicular to each other, so that the orientation of the main body 30 can be adjusted in two different axes. The connection block 311a is secured to the second base block 3212.

Figure 5A:
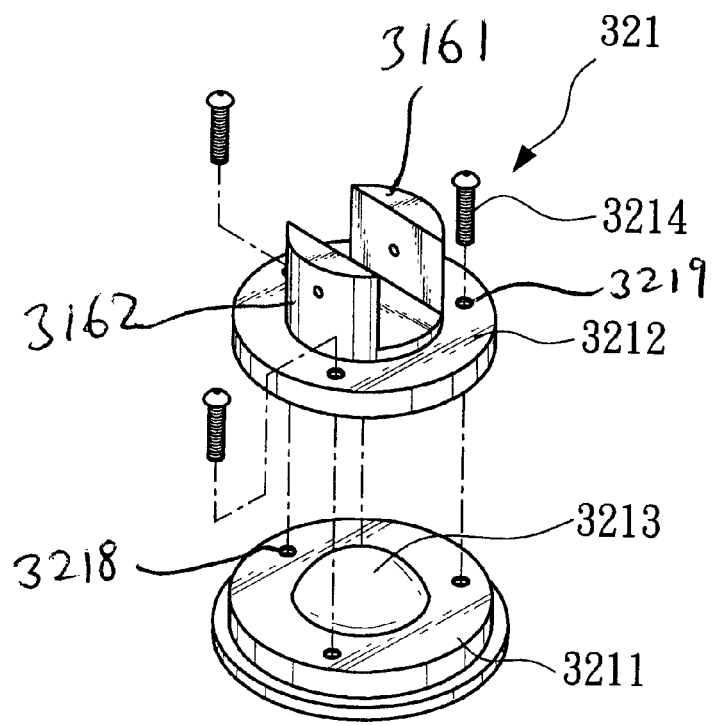
FIG. 5A is an exploded perspective view of an adjustment mechanism that can be used with the apparatus of FIG. 1.
Figure 5B:
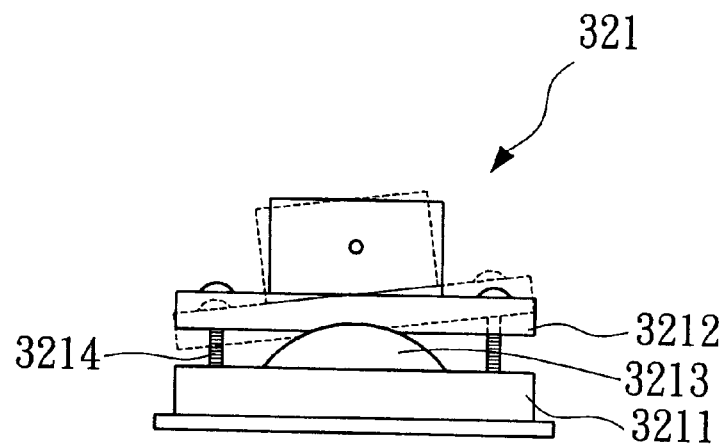
FIG. 5B is a cross-sectional view of the adjustment mechanism of FIG. 5A.

FIGS. 5A and 5B illustrate the adjustment mechanism 321, which has a first base block 3211 and a second base block 3212. A connection protrusion 3213 is provided on the upper surface of the first base block 3211. The connection protrusion 3213 can have a curved or arcuate upper surface, and for example, can be semi-spherical or convex in configuration. The second base block 3212 is placed on the curved upper surface of the connection protrusion 3213. A plurality of adjustment bolts 3214 can be used to couple the second base block 3212 to the first base block 3211 (via threaded openings 3218 and 3219 in the blocks 3211 and 3212, respectively). Since the second base block 3212 is seated on, and can be pivoted about, the curved surface of the connection protrusion 3213, the second base block 3212 can be inclined at different angles with respect to the first base block 3211 by adjusting and turning the adjustment bolts 3214 to allow the second base block 3212 to be pivoted about the curved surface of the connection protrusion 3213 (see dotted lines in FIG. 5B).

Figure 6A:
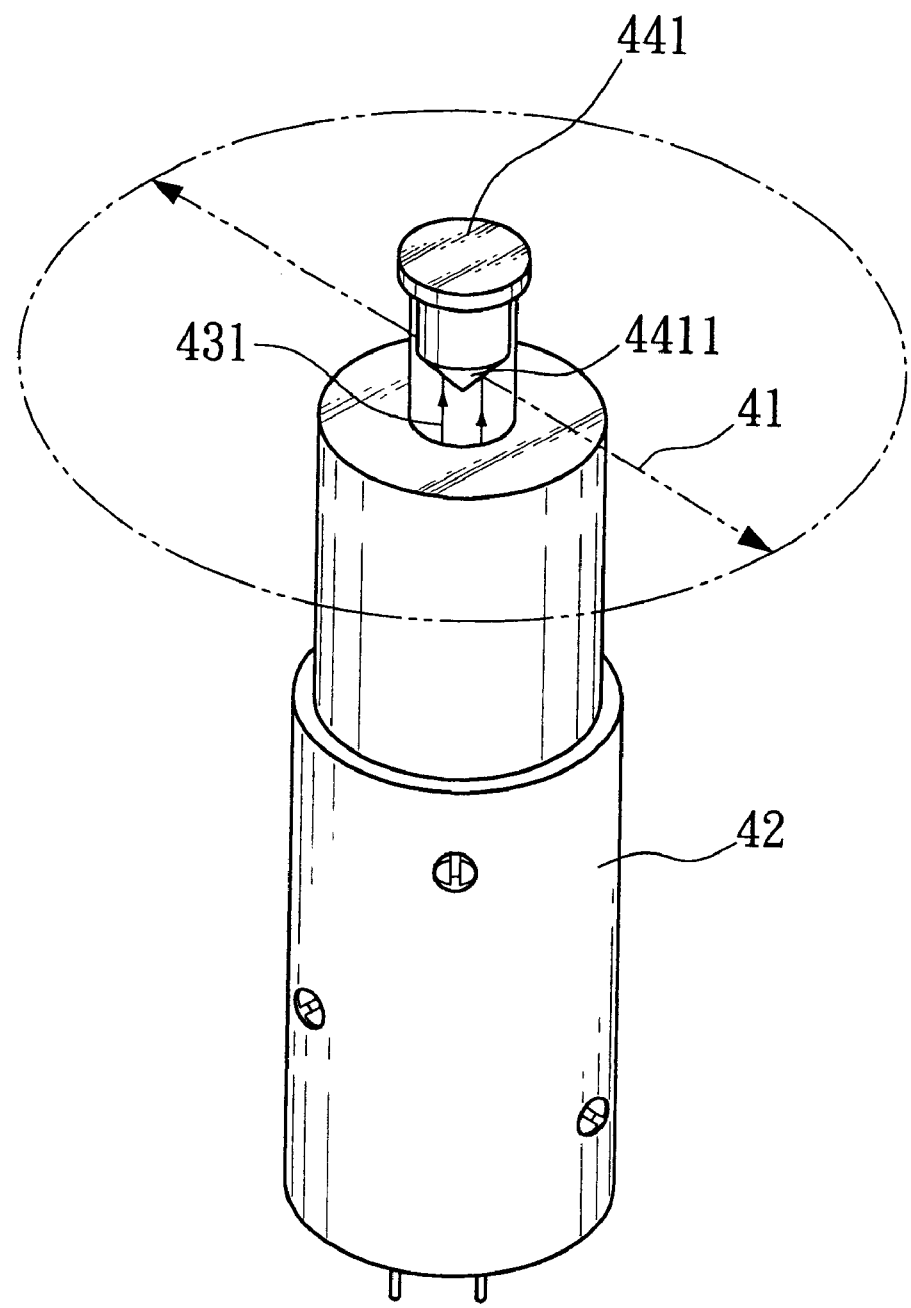
FIG. 6A is an exploded perspective view of a light source module that can be used with the apparatus of FIG. 1.
Figure 6B:
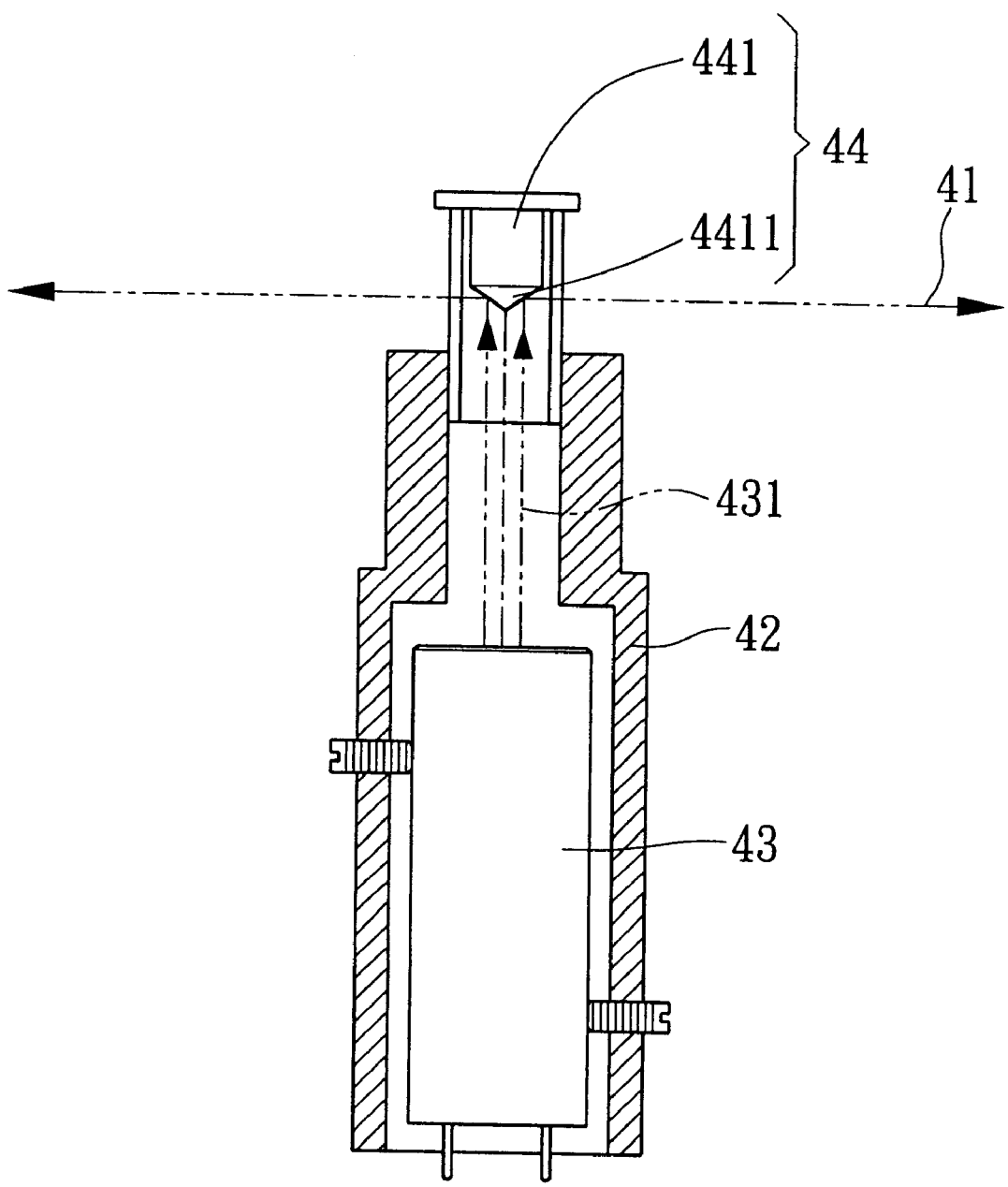
FIG. 6B is a cross-sectional view of the light source module of FIG. 6A.

FIGS. 6A and 6B illustrate the light-source module 40, which has a connection body 42, a light-source emitter 43, and a light-refraction mechanism 44. The connection body 42 is generally cylindrical and has an internal accommodation space that retains the light-source emitter 43 therein. The light-refraction mechanism 44 is connected to the top of the connection body 42 and has a reverse cone 441 with a conical surface 4411 that is aligned with the light-source emitter 43, as best shown in FIG. 6B. Therefore, when the light-source emitter 43 projects a light bundle 431 in straight lines towards the light-refraction mechanism 44, the conical surface 4411 will refract and scatter the light bundle 431 to a light plane 41 that is perpendicular to the light bundle 431. Referring also to FIG. 1, the light plane 41 will be parallel to the ground surface.

Figure 7A:
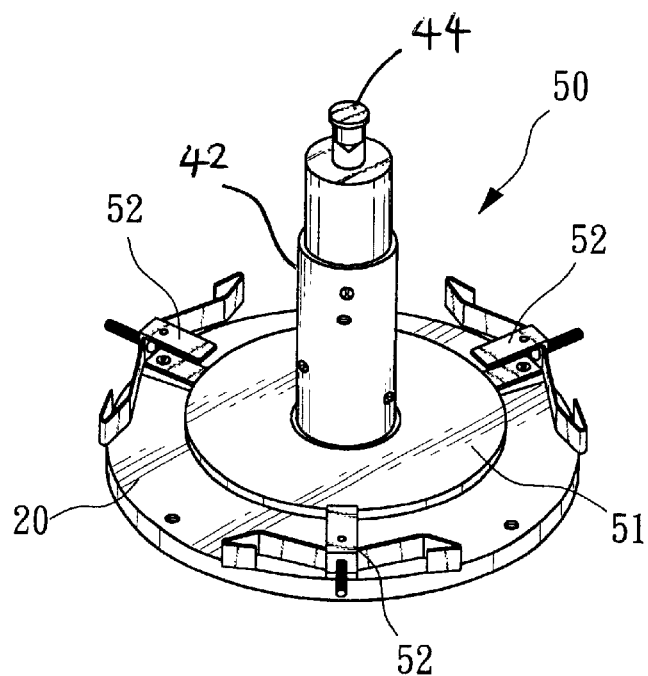
FIG. 7A is a perspective view of a damping mechanism that is used with the apparatus of FIG. 1.
Figure 7B:
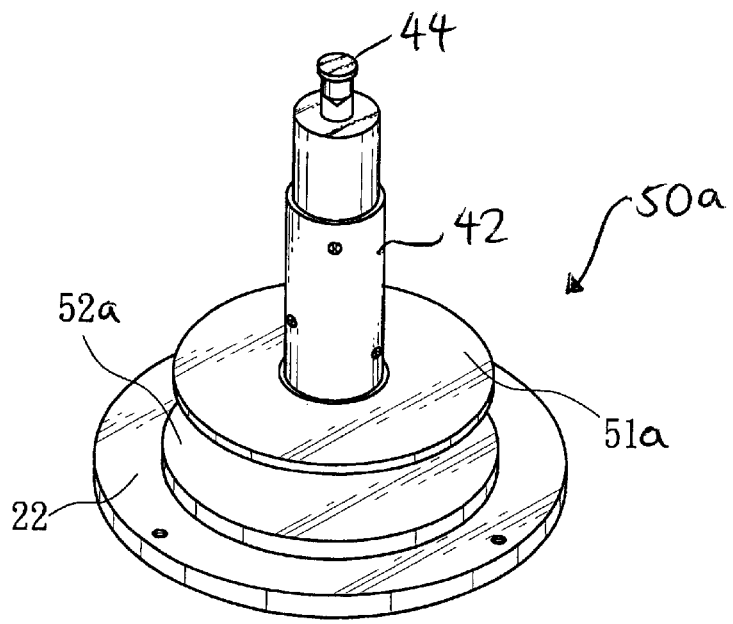
FIG. 7B is a perspective view of another damping mechanism that can be used with the apparatus of FIG. 1.

FIGS. 7A and 7B illustrate two different hanging mechanisms 50 and 50a, respectively, that can be used with the apparatus of the present invention, with the embodiment of FIG. 7A being shown in use in FIGS. 1–2. Referring first to FIG. 7A, the damping mechanism 50 includes a copper ring 51 and a set of magnets 52. The connection body 42 of the light-source module 40 can be connected (e.g., by a click-fixation or snap-fit connection) to the copper ring 51. The copper ring 51 is illustrated as a circular ring, but can assume a square or other shape. In the embodiment of FIG. 7A, six magnets 52 are provided although any number of magnets 52 can be provided. Three magnets 52 are arranged in spaced-apart manner outside the periphery of the copper ring 51 along a plane that extends parallel to and above the upper surface of the copper ring 51. Similarly, three magnets 52 are arranged in spaced-apart manner outside the periphery of the copper ring 51 along a plane that extends parallel to and below the upper surface of the copper ring 51. Other arrangements for the magnets 52 can be utilized without departing from the spirit and scope of the present invention.

FIG. 7B illustrates another damping mechanism 50a, where the copper ring 51a is positioned at the bottom of the light-source module 40. A single magnetic piece 52a is attached to the base seat 22 and is arranged to be generally parallel to and below the copper ring 51a.

In both the embodiments of FIGS. 7A and 7B, when the connection body 42 is connected to the light-source module 40, and if the copper ring 51 or 51a swings, an induced magnetic field is generated since the swinging copper ring 51 or 51a will pass through the magnet(s) 52 or 52a. The induced magnetic field repels the original magnetic field, so as to reduce the swinging motion of the copper ring 51 or 51a to achieve the damping effect.

The elements shown in FIGS. 1–7B can be powered by batteries (not shown) that are coupled to the respective elements by wiring (not shown). The elements shown in FIGS. 1–7B are housed in a casing (not shown) that also houses the batteries, the wiring, and a PC board (not shown).

In use, the projection apparatus for demarcation is placed on the working table 10. At this time, the main body 30 is suspended from the top seat 21 to ensure that it is perpendicular to the ground surface. At this time, the light bundles 431 projected from the light-source module apparatus 40 are vertical to the connection body 42, and are refracted by the conical surface 4411 to form the horizontal light plane 41 that is parallel to the ground (or working table 10) at a fixed height. The adjustment mechanism 321 can be manipulated to adjust and change the inclination angle of the connection between the connection seat 32 and the hanging mechanism 31. Thus, the light plane 41 can be adjusted to an appropriate angle with respect to the ground surface, so that the projection apparatus can be adapted for use on any uneven or undulating topography to project a true and accurate horizontal plane. In the event that the projection apparatus experiences interference and vibration from external influences, the damping mechanism 50 will help the connection body 42 to quickly reach a stationary position.

While the description above refers to particular embodiments of the present invention, it will be understood that modifications may be made without departing from the spirit thereof. The claims are intended to cover such modifications as would fall within the true scope and spirit of the present invention.

What is claimed is:

1. A projection apparatus for demarcation, comprising:
    a frame having a top seat;
    a main body that includes:
        a hanging mechanism that is pivotable about the top seat with respect to a first axis direction and a second axis direction that is different from the first axis direction;
        a connection seat having an adjustment mechanism that is directly coupled to the hanging mechanism in a manner that allows for adjustment of an inclination angle between the connection seat and the hanging mechanism; and
        a light-source module coupled to the connection seat for projecting a light plane.

2. The apparatus of claim 1, wherein the frame further includes a base seat and a plurality of rods that couple the base seat to the top seat.

3. The apparatus of claim 1, wherein the top seat is a ring-shaped structure having an inner hole.

4. The apparatus of claim 1, wherein the hanging mechanism further includes:
    a connection block coupled to the connection seat and which facilitates pivoting of the connection seat in the first axis direction; and
    a hanging rod which extends from the connection block and which facilitates pivoting of the connection block in the second axis direction.

5. The apparatus of claim 4, wherein the hanging mechanism further includes a bearing that is used to support pivoting of the hanging rod with respect to the connection block.

6. The apparatus of claim 1, wherein the first axis direction and the second axis direction are perpendicular to each other.

7. The apparatus of claim 1, wherein the adjustment mechanism further includes:
    a first base block having a connection protrusion;
    a second base block which is pivoted about the connection protrusion; and
    a plurality of bolts that couple the second base block to the first base block, so that the inclination angle between the first base block and the second base block can be changed by adjusting one or more of the bolts.

8. The apparatus of claim 1, wherein the connection seat has a seat body which is coupled to the light-source module.

9. The apparatus of claim 8, further including a plurality of screws for securing the light-source module to the seat body.

10. The apparatus of claim 1, wherein the light plane is parallel to the ground surface.

11. The apparatus of claim 1, wherein the light-source module further includes:
    a connection body having an accommodation space;
    a light-source emitter positioned inside the accommodation space and emitting a light bundle; and
    a light-refraction mechanism connected to the connection body and having a reverse cone that refracts the light bundle to form the light plane.

12. The apparatus of claim 11, wherein the reverse cone has a cone surface to refract the light bundle.

13. The apparatus of claim 11, wherein the light bundle and the light plane are perpendicular to each other.

14. The apparatus of claim 1, further including a damping mechanism, which includes:
    a copper ring which is connected to the light-source module; and
    at least one magnet that is connected to the frame and positioned adjacent the copper ring.

* * * * *